United States Patent
Costa et al.

(10) Patent No.: US 7,328,034 B2
(45) Date of Patent: Feb. 5, 2008

(54) METHOD FOR SYNCHRONIZING A RADIO COMMUNICATION SYSTEM DIVIDED INTO RADIO CELLS, A BASE STATION AND MOBILE STATION IN SUCH A SYSTEM

(75) Inventors: Elena Costa, München (DE); Dirk Galda, Haar-Gronsdorf (DE); Niclas Meier, München (DE); Hermann Rohling, Wolfenbüttel (DE); Egon Schulz, München (DE); Martin Weckerle, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 10/567,466

(22) PCT Filed: Jul. 7, 2004

(86) PCT No.: PCT/EP2004/051395

§ 371 (c)(1),
(2), (4) Date: Feb. 7, 2006

(87) PCT Pub. No.: WO2005/015777

PCT Pub. Date: Feb. 17, 2005

(65) Prior Publication Data

US 2006/0234738 A1 Oct. 19, 2006

(30) Foreign Application Priority Data

Aug. 7, 2003 (DE) ................. 103 36 312

(51) Int. Cl.
*H04B 7/01* (2006.01)

(52) U.S. Cl. .................... 455/502; 370/350; 375/356

(58) Field of Classification Search ................ 455/502, 455/503; 370/350; 375/356, 358
See application file for complete search history.

(56) References Cited

U.S. PATENT DOCUMENTS

| 6,141,332 A * | 10/2000 | Lavean ................. 370/335 |
| 6,307,840 B1 | 10/2001 | Wheatley, III et al. |
| 2002/0072370 A1 | 6/2002 | Johansson et al. |
| 2002/0075978 A1 | 6/2002 | Dick et al. |

FOREIGN PATENT DOCUMENTS

| DE | 199 53 486 A1 | 5/2001 |
| EP | 1 226 659 B1 | 7/2002 |
| WO | 00/35117 A2 | 6/2000 |

* cited by examiner

*Primary Examiner*—Lee Nguyen
(74) *Attorney, Agent, or Firm*—Staas & Halsey LLP

(57) ABSTRACT

A method synchronizes a radio communication system divided into radio cells. Data is transmitted in the radio communication system by a multiple access method. Each radio cell thus has a base station for the radio feed of several mobile stations, allocated to the radio cell. A synchronization of the base station is carried out using the received signals from mobile stations in the same radio cell and also in adjacent radio cells. The base station determines at least one pilot signal and signals said pilot signal to the allocated mobile stations in a downwards direction. The allocated mobile stations transmit the signaled pilot signal in an upwards direction to the base station. The base station determines a synchronization value, from the received pilot signals from the radio cell thereof and also from the adjacent radio cells, fro a time synchronization and/or for a frequency synchronization on which the bas station is synchronized.

19 Claims, 5 Drawing Sheets

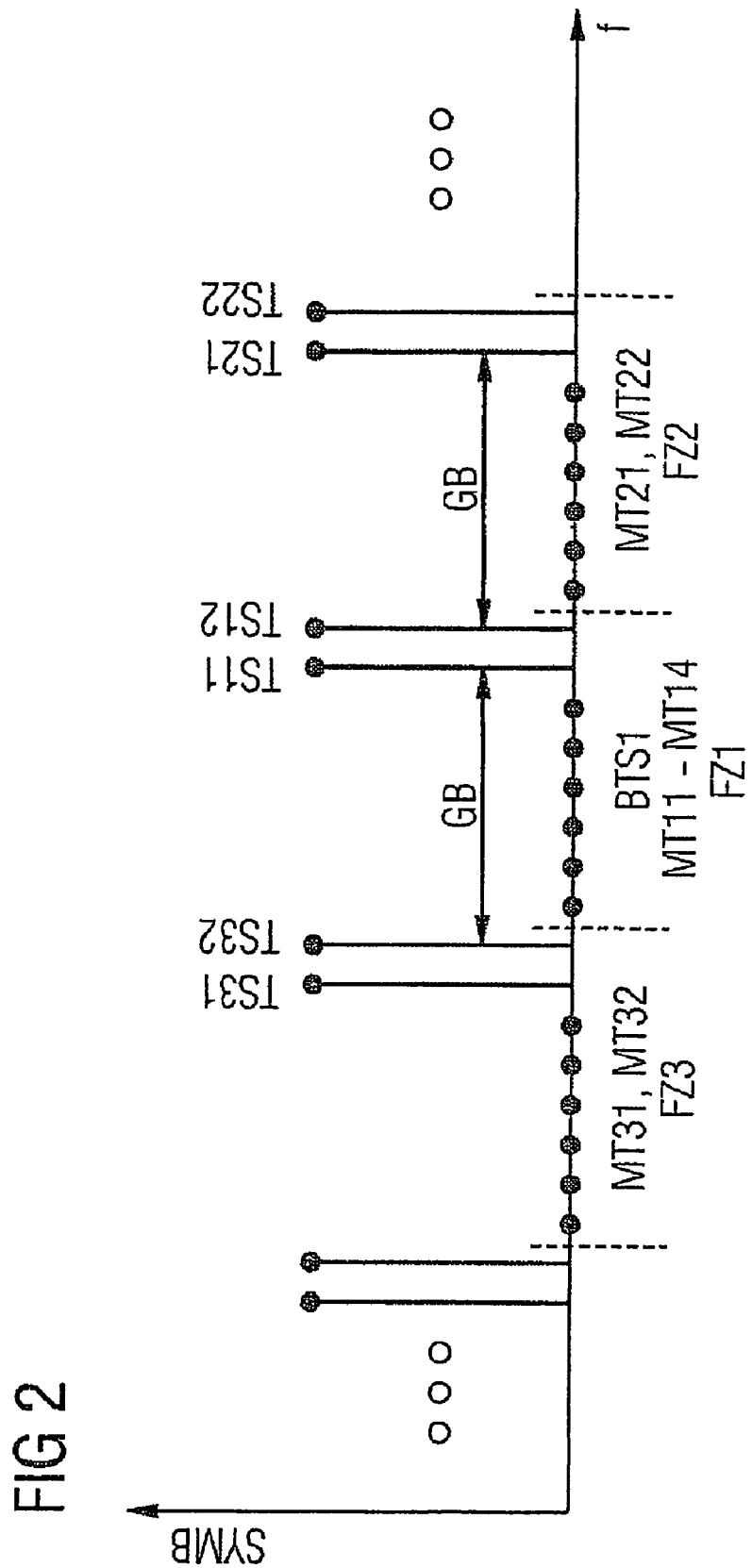

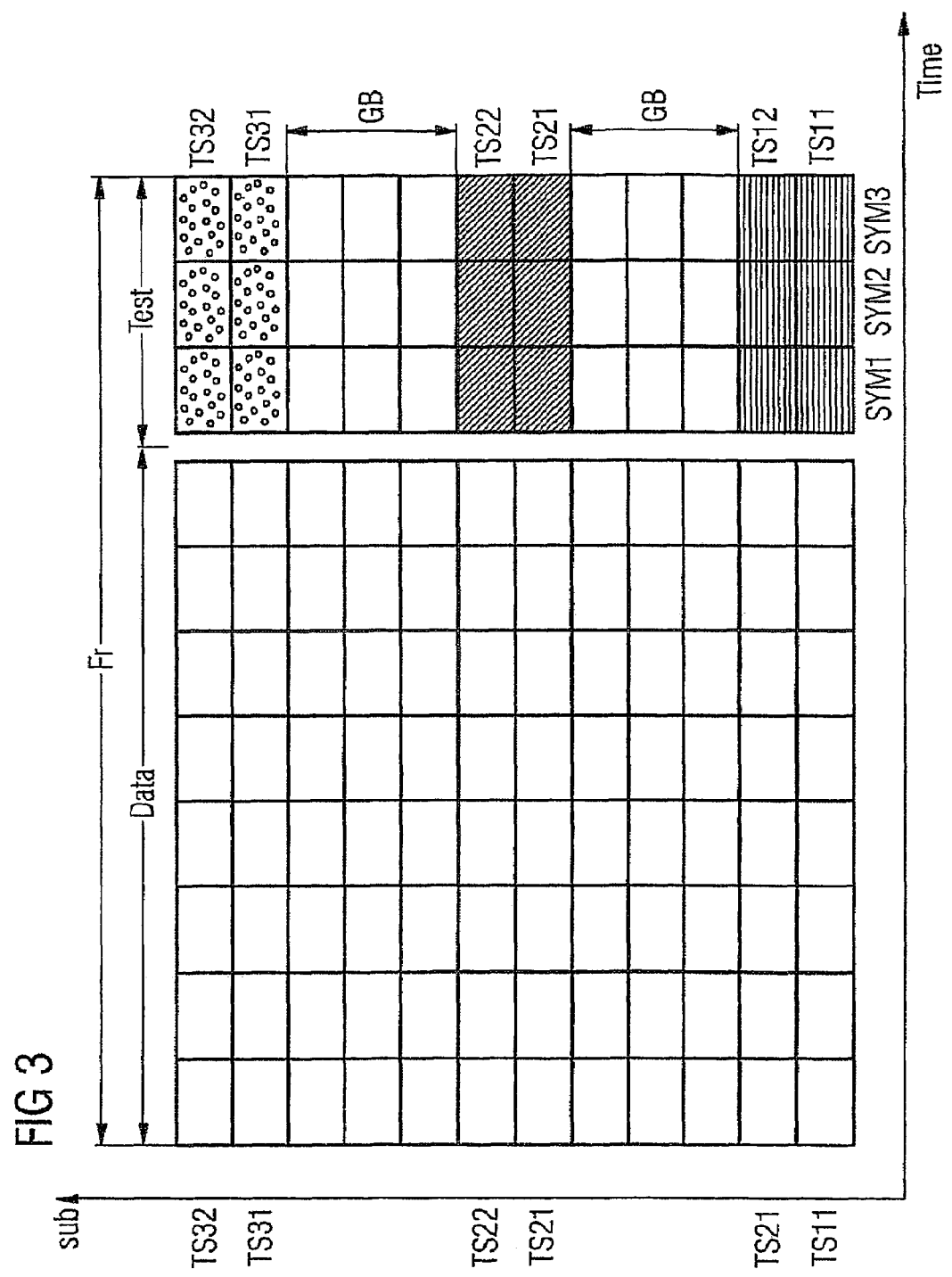

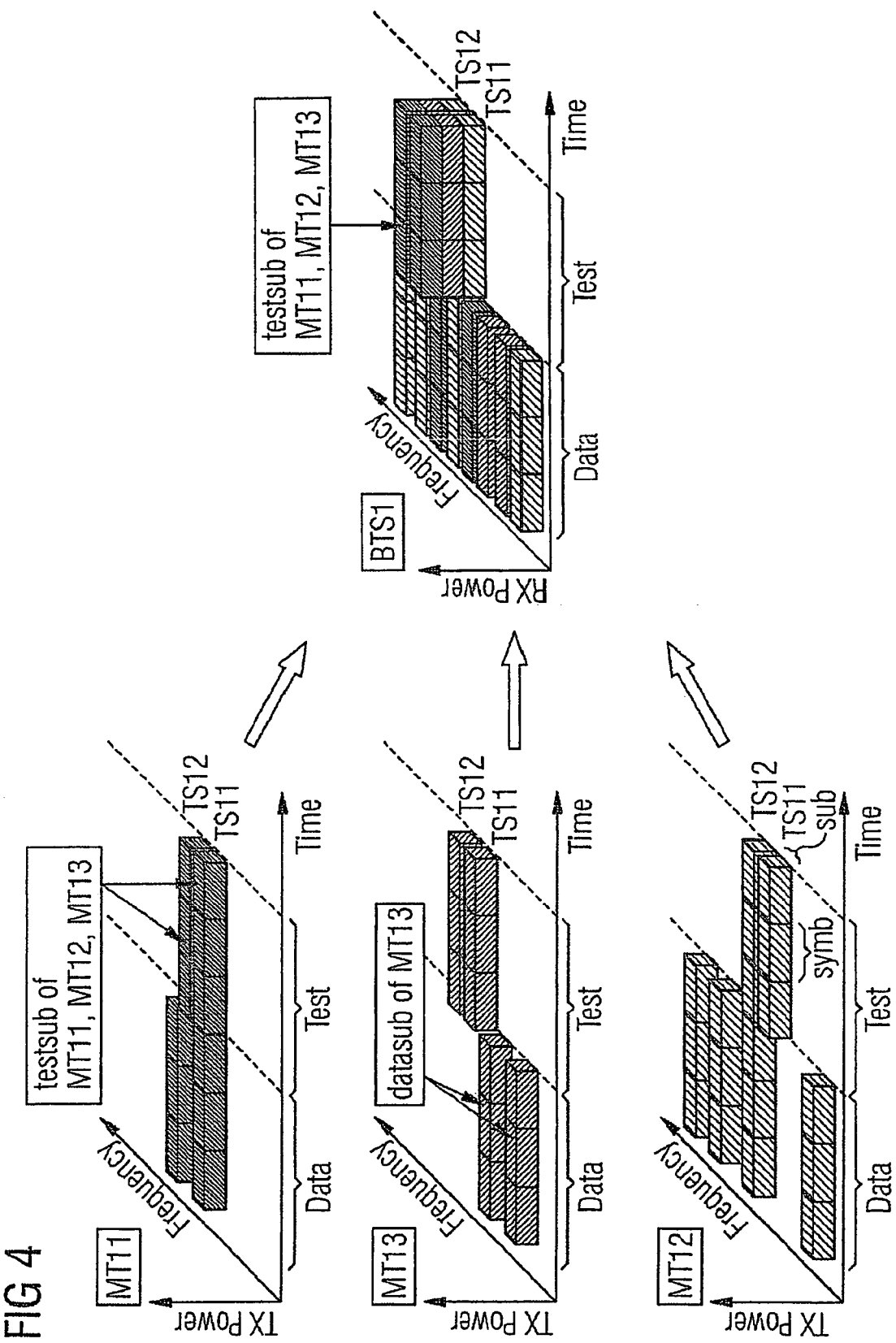

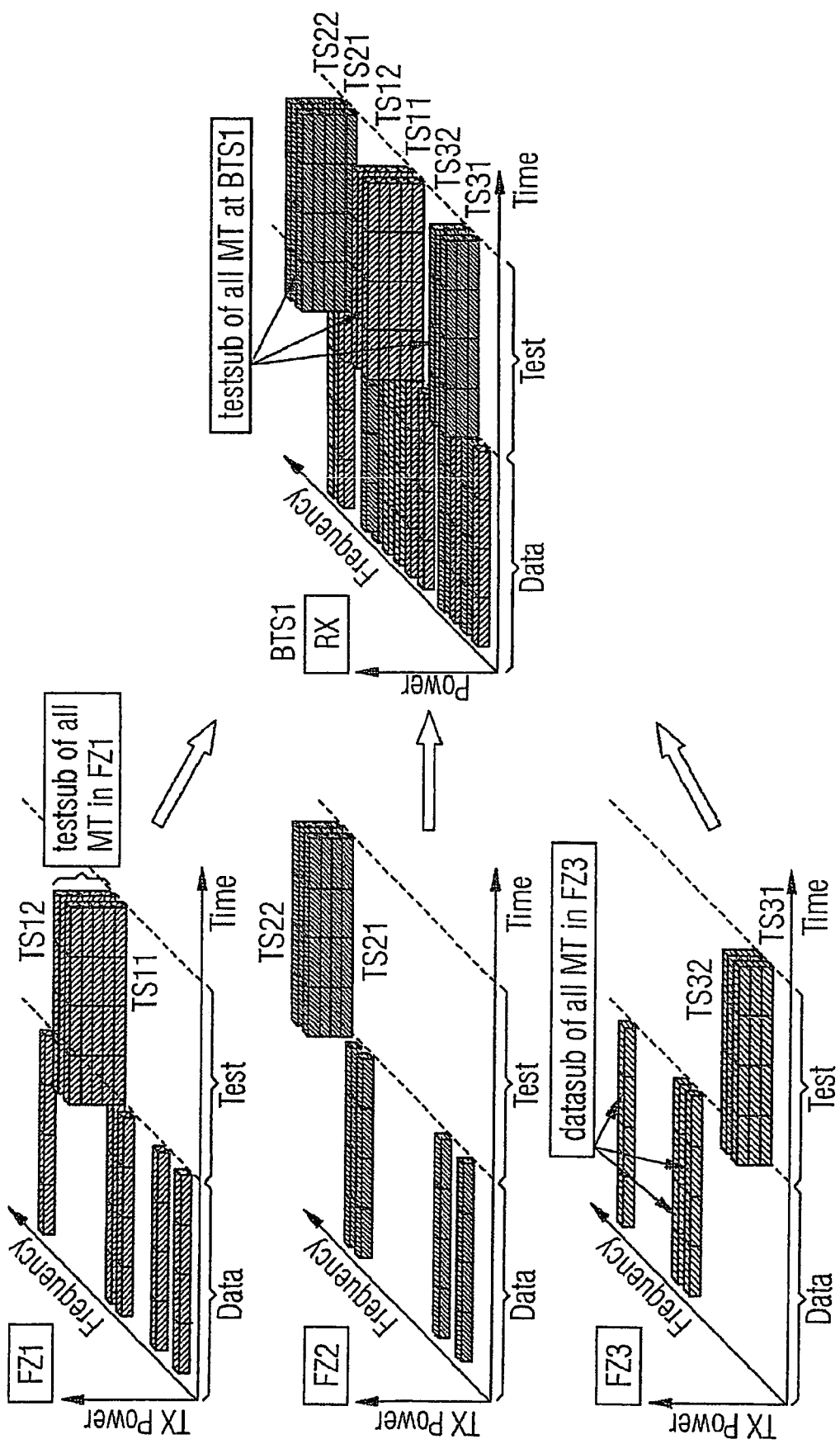

METHOD FOR SYNCHRONIZING A RADIO COMMUNICATION SYSTEM DIVIDED INTO RADIO CELLS, A BASE STATION AND MOBILE STATION IN SUCH A SYSTEM

CROSS REFERENCE TO RELATED APPLICATIONS

This application is based on and hereby claims priority to PCT. Application No. PCT/EP2004/051395 filed Jul. 7, 2004, and German Application No. 10336312.2 filed on Aug. 7, 2003, the contents of which are hereby incorporated by reference.

BACKGROUND OF THE INVENTION

The invention relates to a method for synchronizing a radio communication system divided into radio cells a base station, a mobile station and a radio communication system.

Cellular radio communication systems, in particular mobile radio systems, are subdivided into synchronized and unsynchronized radio communication systems.

In the case of the former, base stations of adjacent radio cells are synchronized with each other in respect of time and/or carrier frequency. For the purposes of synchronization, in particular for time synchronization, GPS receivers are for example deployed at the base stations or base stations are synchronized by synchronization signals that are complex to exchange. The transmission of synchronization signals also takes up radio transmission resources, which are then no longer available for chargeable user data transmissions (payload).

In the case of unsynchronized radio communication systems, base stations of adjacent cells are not synchronized with each other.

Synchronization methods are particularly important in mobile radio networks in particular, when so-called Orthogonal Frequency Division Multiplexing or OFDM transmission methods are used. Services requiring high data speeds, for example video transmissions, can be transmitted in a cost-effective manner by OFDM data transmissions. OFDM data transmission takes place by so-called subcarriers, which are formed by subdividing an available bandwidth. As these subcarriers are particularly advantageously used in a multiple manner in adjacent cells, resulting co-channel interference should be taken into account during planning and operation.

So that radio transmission resources can be allocated or managed (Radio Resource Management RRM) in an optimum manner in respect of data transmission, frequency and/or time synchronization must be precise, depending on the radio transmission methods used in each instance. The two synchronization methods mentioned by way of example, because they are based on received mobile station signals, are largely dependent both on the quality and number of received mobile station signals, as far as precision is concerned.

SUMMARY OF THE INVENTION

One possible object of the present invention is therefore to specify a synchronization method with a low level of complexity for a radio communication system with a cellular structure, in particular a mobile radio system with OFDM data transmission. The method allows synchronization to be achieved in respect of time and/or frequency in a cellular radio communication system in a simple manner with the aid of pilot signals.

The use of cost-intensive GPS receivers in particular is thereby dispensed with, as is the transmission of additional signaling information for synchronization purposes, as had to be exchanged previously on a higher protocol level between base station and mobile station.

Synchronization is implemented independently and exclusively by receive-side signal processing and subsequent adjustment of the synchronization status of the base stations or mobile stations.

Pilot signals are used, for example, so that pilot signal overlay takes place within each radio cell, advantageously resulting in a high signal-to-noise ratio of the pilot signal at the base station in question. Receive-side evaluation of the pilot signals for synchronization purposes therefore takes place, even if the receive conditions are unfavorable.

The method advantageously allows pilot signal overlay with a high signal-to-noise ratio to be achieved at the base station in question, said high signal-to-noise ratio allowing the receive-side evaluation of pilot signals for synchronization purposes to take place, even if the receive conditions are unfavorable.

With the method the proposed pilot signal structure and the in particular randomly occurring selection of the pilot signal mean that no central control device is required to emit the respective pilot signals.

The pilot signal selection and assignment, which take place for example in a radio-cell-specific manner and optionally by random selection, allow radio-cell-dependent weighting of received mobile station signals and base station signals. When determining the synchronization value for the frequency and/or time synchronization to be implemented, it is therefore possible to weight the synchronization value estimation in respect of the radio cells, so that even weakly received mobile station and base station signals ae taken into account.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a pilot signal subcarrier receive situation at a base station as illustrated in FIG. 1, FIG. 3 shows a frame, with the aid of which both useful data and pilot signals are transmitted, with reference to FIGS. 1 and 2, FIG. 4 shows the overlaying of mobile station signals from a common radio cell at a base station and FIG. 5 shows the overlaying of mobile station signals from adjacent radio cells at a base station.

DETAILED DESCRIPTION OF THE PREFERRED EMBODIMENT

Figure 1:
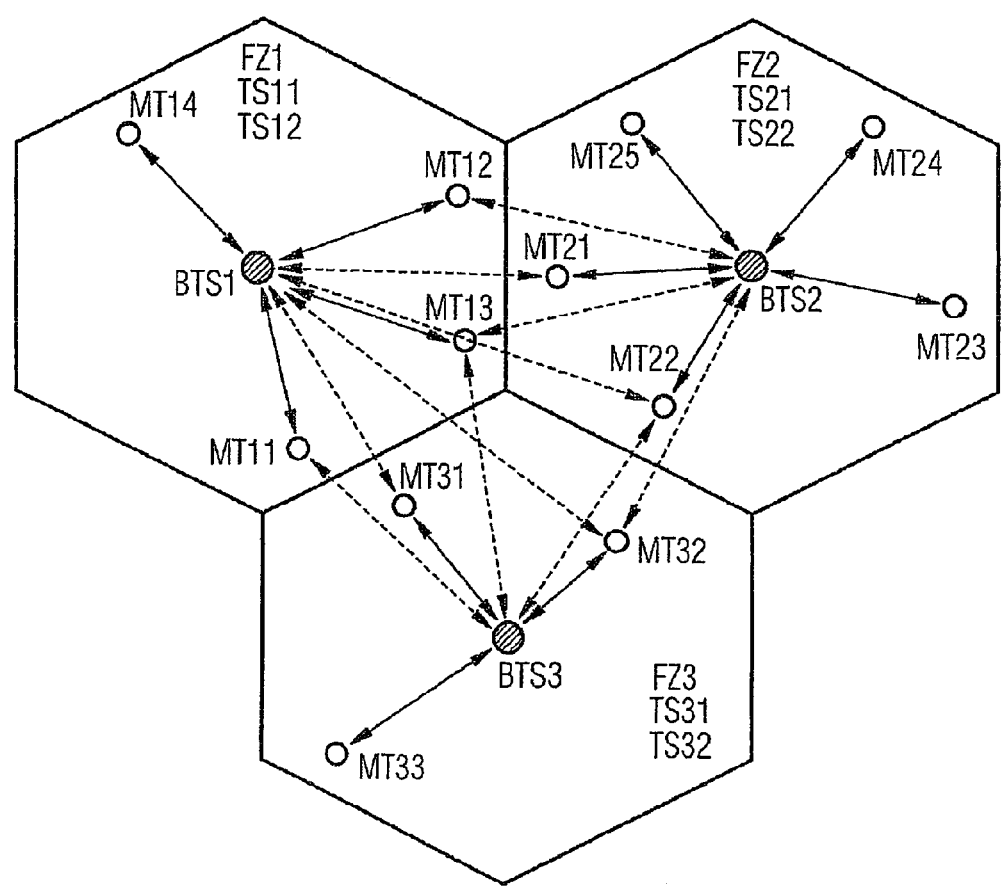
FIG. 1 shows a synchronization method according to one embodiment of the invention, in a radio communication system with a cellular structure.

Reference will now be made in detail to the preferred embodiments of the present invention, examples of which are illustrated in the accompanying drawings, wherein like reference numerals refer to like elements throughout.

FIG. 1 shows one embodiment of a synchronization method in a radio communication system with a cellular structure.

A cellular radio communication system is considered, which represents other mobile radio systems, in which a data transmission is implemented by an OFDM transmission method, such that the data transmission takes place by a frame structure based on time slots and Frequency Division Multiple Access FDMA.

An available bandwidth is subdivided into so-called subcarriers and different users transmit in time slots on different subcarriers.

Base stations of adjacent radio cells share the use of a stock of radio transmission resources, formed by subcarrier time slots. Adjacent radio cells therefore have a frequency repetition factor of one in respect of the subcarriers.

Three adjacent radio cells FZ1 to FZ3 each have a base station BTS1 to BTS3. Each individual base station BTS1 to BTS3 covers a number of mobile stations MT11 to MT33 assigned to the respective radio cell FZ1 to FZ3. A total of four mobile stations MT11 to MT14 is thereby assigned to a first base station BTS1 for radio coverage purposes, a total of five mobile stations MT21 to MT25 is thereby assigned to a second base station BTS2 and a total of three mobile stations MT31 to MT33 is thereby assigned to a third base station BTS3 for radio coverage purposes.

The first base station BTS1, representing all the others, selects two pilot signal subcarriers TS11 and TS12 from the available subcarriers for a pilot signal transmission based on OFDM data transmission. The first base station BTS1 notifies the assigned mobile stations MT11 to MT14 for example of the selected pilot signal subcarriers TS11 to TS12 by direct signaling.

These selected pilot signal subcarriers TS11 to TS12 are used in parallel with other subcarriers, which are assigned to a useful data transmission, to transmit a data frame to be sent in a downlink.

In contrast to direct signaling of the pilot signal subcarriers used, it is also possible to use tables disposed on the transmit side and receive side, in which pilot signal subcarrier pairs to be used are stored respectively. In this instance the base station notifies the assigned mobile stations of a corresponding subcarrier pair by reference to a table input.

Random selection of pilot signal subcarrier pairs can also take place with the aid of a hopping pattern with a defined number of pilot signal subcarriers. The assigned mobile stations are then notified of the hopping pattern for example.

The signaled pilot signal subcarriers TS11, TS12 are also used by the mobile stations MT11 to MT14 for pilot signal transmission in an uplink to the first base station BTS1.

Selection of the pilot signal subcarriers by the base station BTS1 is advantageously random and is carried out in an alternating manner frame by frame, as a result of which the pilot signal subcarriers alternate frame by frame both in the uplink and in the downlink.

The same applies to the second base station BTS2 and the third base station BTS3 of the adjacent radio cells FZ2 and FZ3. The second base station BTS2 for example selects two pilot station subcarriers TS21 and TS22, which it signals in the downlink to the assigned mobile stations MT21 to MT25, while the third base station BTS3 for example selects two pilot station subcarriers TS31 and TS32 and signals them correspondingly to the mobile stations MT31 to MT33 assigned to it.

For their part the mobile stations MT21 to MT25 use the pilot signal subcarriers TS21 and TS22 assigned to them for a pilot signal transmission in the uplink to the second base station BTS2, while the mobile stations MT31 to MT33 use the pilot signal subcarriers TS31 and TS32 assigned to them for a pilot signal transmission in the uplink to the third base station BTS3.

Synchronization is described in more detail with reference to the first radio cell FZ1, which also represents the adjacent radio cells FZ2, FZ3. Synchronization here refers to a time synchronization of time slots and/or a frequency synchronization of the subcarriers used.

The first base station BTS1 of the first radio cell FZ1 receives both the pilot signals TS11, TS12 of the mobile stations MT11 to MT14 assigned to it and for example the pilot signals TS21, TS22, TS31, TS32 from the mobile stations MT21, MT22, MT31, MT32 of the adjacent radio cells FZ2 and FZ3 in the uplink UL. On the basis of the received pilot signals TS11, TS12, TS21, TS22, TS31 and TS32 the first base station BTS1 determines a first time deviation and/or a first frequency deviation and uses these values to derive an appropriate synchronization value for time and/or frequency synchronization, to which the first base station BTS1 is synchronized.

A third mobile station MT13 of the first radio cell FZ1, which represents all the mobile stations, receives both pilot signals TS11, TS12 from the base station BTS1 of its own radio cell FZ1 and pilot signals TS21, TS22, TS31, TS32 from the adjacent base stations BTS2 and BTS3 of the radio cells FZ2 and FZ3 in the downlink. On the basis of the received pilot signals TS11, TS12, TS21, TS22, TS31 and TS32 the third mobile station M13 now determines a second time deviation and/or a second frequency deviation and uses these values to derive an appropriate synchronization value for time and/or frequency synchronization, to which the mobile station MT13 is synchronized.

Synchronization is repeated frame by frame, as a result of which a precise, automatically organized time and/or frequency synchronization is achieved on average over time.

With reference to FIG. 1, FIG. 2 shows a pilot signal subcarrier receive situation at the first base station BTS1. Subcarrier frequencies f are thereby plotted on the horizontal axis and symbols SYMB on the vertical axis.

The first base station BTS1 receives both the pilot signal subcarriers TS11 and TS12 from the mobile stations MT11 to MT14 that can be assigned to the first radio cell FZ1 and the pilot signal subcarriers TS21 and TS22 from the mobile stations MT21 and MT22 that can be assigned to the second radio cell FZ2 and the pilot signal subcarriers TS31 and TS32 from the mobile stations MT31 and MT32 that can be assigned to the third radio cell FZ3.

During pilot signal transmission no symbols SYMB— shown here as circular markings on the horizontal axis—are transmitted by the further available subcarriers.

The subcarrier pairs TS11 and TS12, TS21 and TS22, TS31 and TS32 are separated by an unused subcarrier band GB, which prevents intercarrier interference ICI for the duration of the pilot signal.

FIG. 3 shows a frame Fr, which is used to transmit both useful data Data and pilot signals Test, with reference to FIGS. 1 and 2.

Available subcarriers sub are thereby plotted on the vertical axis, while a pattern over time Time of the frame fr is shown on the horizontal axis.

The frame Fr has a first block Data used to transmit useful data, the useful data transmission being implemented with the aid of an OFDM data transmission not described in more detail here. A second block Test follows the first block Data, said second block Test being used for pilot signal transmission.

In a preferred embodiment two directly adjacent subcarriers TS11 and TS12 or TS21 and TS22 or TS31 and TS32 respectively are selected as pilot signals by each base station. A time deviation, for example from the first base station BTS1 to the mobile stations MT11 to MT14, MT21, MT22, MT31 and MT32 is determined by estimation on the basis of two adjacent pilot signal subcarriers, each transmitting the same symbols.

At least two successive symbols SYM1 and SYM2 or SYM2 and SYM3 of the pilot signal subcarriers TS11 and TS12 or TS21 and TS22 or TS31 and TS32 are used to determine a frequency synchronization value for a frequency synchronization. The use of three symbols SYM1 to SYM3 improves the precision of the estimation carried out to generate the frequency synchronization value, as this prevents so-called intersymbol interference ISI during the evaluation for synchronization purposes.

The pilot signal subcarriers TS11 and TS12 or TS21 and TS22 or TS31 and TS32 of a radio cell are ideally directly adjacent, but it is also possible for there to be an interval between the two pilot signal subcarriers TS11 and TS12 or between the two pilot signal subcarriers TS21 and TS22 or between the two pilot signal subcarriers TS31 and TS32. This interval should be selected such that the individual pilot signal subcarriers are separated from each other according to a predefinable minimum phase deviation.

FIG. 4 shows a segment of the overlay of mobile station signals from the mobile stations MT11 to MT12 of the common radio cell FZ1 at the base station BTS1. A transmit power TX Power is thereby plotted on the vertical axis with a pattern over time Time of a frame on the horizontal axis, while a third axis is used to show subcarrier frequencies Frequency.

The three mobile stations MT11 to MT13 each simultaneously use pilot signal subcarriers testsub with the same structure within an area Test in the uplink.

In contrast in an area Data the respective useful data transmission from the respective mobile station MT11 to MT13 takes place with the aid of subcarriers datasub.

Additive overlaying of the mobile station signals sent from the mobile stations MT11 to MT13 takes place at the base station BTS1, with a significant rise in the signal level being achieved in the area Test, without an increase in transmit power being required on the part of the mobile stations MT11 to MT13 for this purpose.

To summarize, standard symbols of the pilot signals subcarriers testsub are transmitted simultaneously within a radio cell from all mobile stations MT11 to MT13, thereby achieving a rise in the receive level of the cumulative signal at the base station BTS1 in question. A maximum frequency interval is ideally used between the subcarrier pairs used for the pilot signal transmission. A phase-continuous pilot signal is transmitted in an advantageous embodiment.

An OFDM symbol symb and an OFDM subcarrier sub are input at the mobile station MT12, representing the mobile stations MT11 to MT13 and the base station BTS1.

FIG. 5 shows a segment of the overlaying of mobile station signals of adjacent radio cells FZ1 to FZ3 at a receiving base station BTS1.

A transmit power TX Power is thereby plotted on the vertical axis and a pattern over time Time of a frame is plotted on the horizontal axis, while a third axis is used to show subcarrier frequencies Frequency.

A useful data transmission again takes place in the area Data, while a pilot signal transmission with corresponding pilot signal subcarriers again takes place in the area Test.

Mobile station signals from the three radio cells FZ1 to FZ3 are cumulatively overlaid with respectively assigned pilot signal subcarrier pairs TS11 and TS12, TS21 and TS22 and TS31 and TS32 at the base station BTS1.

Every received subcarrier pair TS11 and TS12, TS21 and TS22 and TS31 and TS32 can be assigned to a radio cell FZ1 to FZ3. This means that the time and frequency deviations occurring in adjacent radio cells can be determined individually in each base station.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for synchronizing a radio communication system divided into radio cells, comprising:
   transmitting data using a multiple access method, each radio cell having a base station for providing radio coverage to a plurality of mobile stations assigned to the radio cell and the base station;
   selecting a pilot signal at each base station and transmitting the pilot signal to the mobile stations assigned to the the base station in a downlink transmission;
   transmitting the received pilot signal to the base station from the mobile stations assigned to the base station, in an uplink transmission;
   receiving at the base station pilot signals from the mobile stations assigned to the base station and pilot signals from mobile stations assigned to adjacent radio cells; and
   using the pilot signals received to determine a synchronization value for a time synchronization and/or a frequency synchronization, to which the base station synchronizes itself.

2. The method according to claim 1, wherein
   at least one of the mobile stations receives the pilot signal from the base station to which the mobile station is assigned and receives pilot signals from base stations of adjacent radio cells, and
   the mobile station uses the received pilot signals to determine a synchronization value for a time synchronization and/or for a frequency synchronization, to which the mobile station synchronizes itself.

3. A mobile station, characterized by means for implementing the method according to claim 2.

4. A radio communication system, comprising at least one mobile station according to claim 3.

5. The method according to claim 1, wherein the pilot signal is selected by the base station in a random manner and/or the pilot signal is transmitted by the mobile stations assigned to the base station in an uplink transmission such that a cumulative increase in signal level for the pilot signal is experienced at the base station, the base station selecting the pilot signal for which the cumulative increase in signal level is experienced.

6. The method according to claim 1, wherein a time slot multiple access method and/or a frequency multiple access method is used for data transmission.

7. The method according to claim 6, wherein in the case of the time slot multiple access method with data transmission frame by frame, the pilot signal is transmitted at the end of the frame.

8. The method according to one of claims 6, wherein
different pilot signals are used, and
the same time slots and/or same frequencies are used for transmitting the different pilot signals.

9. The method according to claim 1, wherein
a time slot multiple access method is used for data transmission frame-by-frame,
different pilot signals are used,
the pilot signals alternate frame-by-frame.

10. The method according to claim 1, wherein an OFDM data transmission method is used for data transmission and at least two pilot signal subcarriers are used for pilot signal transmission.

11. The method according to claim 10, wherein
at least two different pilot signals are used, and
when a time slot multiple access method with frame by frame data transmission is used, the different pilot signals are alternately sent by alternating pilot signal subcarriers frame by frame.

12. The method according to claim 11, wherein the base station transmits pilot signals using directly adjacent pilot signal subcarriers.

13. The method according to 11, wherein the pilot signals are formed respectively by at least two successive symbols and the successive symbols are transmitted by the pilot signal subcarriers.

14. The method according to claim 13, wherein during pilot signal transmission no further symbols are transmitted by further available subcarriers.

15. The method according to claim 13, wherein
a time deviation is determined based on a phase rotation established between received symbols of different pilot signal subcarriers and/or
a frequency deviation is determined based on a phase rotation established between successive symbols of a pilot signal subcarrier.

16. The method according to claim 10, wherein when a time slot multiple access method with frame by frame data transmission is used, pilot signal transmission takes place at the end of the frame.

17. The method according to claim 1, wherein data transmission is performed using a time division duplex radio transmission standard or a frequency division duplex radio transmission standard.

18. A base station assigned to a radio cell for synchronizing a radio communication system divided into radio cells, comprising:
transmission means for transmitting data using a multiple access method, the data being transmitted to a plurality of mobile stations assigned to the radio cell of the base station;
selection means for selecting a pilot signal at the base station and transmitting the pilot signal to the mobile stations assigned to the base station in a downlink transmission;
receiving means for receiving return pilot signals transmitted in an uplink direction to the base station from the mobile stations assigned to the base station and mobile stations assigned to adjacent radio cells; and
synchronization means to synchronize the base station using the pilot signals received and a determined time synchronization and/or frequency synchronization value.

19. A radio communication system, comprising at least one base station according to claim 18.

* * * * *